US006303042B1

(12) United States Patent
Hawkins et al.

(10) Patent No.: US 6,303,042 B1
(45) Date of Patent: Oct. 16, 2001

(54) MAKING INK JET NOZZLE PLATES

(75) Inventors: Gilbert A. Hawkins, Mendon; Xin Wen, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/260,698

(22) Filed: Mar. 2, 1999

(51) Int. Cl.[7] .......... G11B 5/127

(52) U.S. Cl. .......... 216/27; 216/47; 216/51; 216/56; 216/57; 216/79; 216/99

(58) Field of Search .......... 216/27, 47, 51, 216/56, 57, 79, 99

(56) References Cited

U.S. PATENT DOCUMENTS

| | | | | |
|---|---|---|---|---|
| 3,946,398 | | 3/1976 | Kyser et al. . | |
| 4,460,728 | | 7/1984 | Schmidt, Jr. et al. . | |
| 4,723,129 | | 2/1988 | Endo et al. . | |
| 4,863,560 | * | 9/1989 | Hawkins | 156/644 |
| 5,118,384 | * | 6/1992 | Harmon et al. | 156/643 |
| 5,200,768 | * | 4/1993 | Shibaike et al. | 346/140 |
| 5,896,150 | * | 4/1999 | Kobayashi et al. | 347/71 |

FOREIGN PATENT DOCUMENTS

| | | | | |
|---|---|---|---|---|
| 0 827 833 A2 | | 7/1997 | (EP) . | |
| 6-87217-A | * | 3/1994 | (JP) | B41J/2/16 |
| 98/08687 | | 3/1998 | (WO) . | |

* cited by examiner

*Primary Examiner*—Randy Gulakowski
*Assistant Examiner*—Michael Kornakov
(74) *Attorney, Agent, or Firm*—Raymond L. Owens

(57) ABSTRACT

A method for forming an ink jet nozzle plate includes providing a structure having a top substrate layer, a bottom substrate layer, and a buried layer disposed between the top substrate layer and the bottom substrate layer; providing a composite mask over the top substrate layer having a cavity mask which provides openings and a bore mask having openings which are entirely within the openings of the cavity mask and extend to the top substrate layer; anisotopically etching through the bore mask openings through top substrate layer and the buried layer into a portion of the bottom substrate layer; removing the bore mask and etching the top and bottom substrate layers without substantially affecting the buried layer to extend the openings in the top substrate layer and the bottom substrate layer; removing the cavity mask and attaching the top substrate layer to a base provided with ink delivery channels with correspond to the openings in the buried layer; and removing the bottom substrate layer.

5 Claims, 15 Drawing Sheets

MAKING INK JET NOZZLE PLATES

CROSS REFERENCE TO RELATED APPLICATIONS

Reference is made to commonly assigned U.S. patent application Ser. No. 09/208,358, filed Dec. 10, 1998, entitled “Fabricating Ink Jet Nozzle Plate,” by Hawkins et al. and U.S. patent application Ser. No. 09/216,523, filed Dec. 18, 1998, entitled “Fabricating Ink Jet Nozzle Plates With Reduced Complexity,” by Hawkins et al. The disclosure of these related applications is incorporated herein by reference.

FIELD OF THE INVENTION

The present invention relates to the fabrication of ink jet nozzle plates for ink jet printing apparatus.

BACKGROUND OF THE INVENTION

Ink jet printing has become a prominent contender in the digital output arena because of its non-impact, low-noise characteristics, and its compatibility with plain paper. Ink jet printing avoids the complications of toner transfers and fixing as in electrophotography and the pressure contact at the printing interface as in thermal resistive printing technologies. Ink jet printing mechanisms includes continuous ink jet or drop-on-demand ink jet. U.S. Pat. No. 3,946,398, which issued to Kyser et al. in 1970, discloses a drop-on-demand ink jet printer which applies a high voltage to a piezoelectric crystal, causing the crystal to bend, applying pressure on an ink reservoir and jetting drops on demand. Piezoelectric ink jet printers can also utilize piezoelectric crystals in push mode, shear mode, and squeeze mode. EP 827 833 A2and WO 98/08687 disclose a piezoelectric ink jet print apparatus with reduced crosstalk between channels, improved ink protection, and capability of ejecting variable ink drop size.

U.S. Pat. No. 4,723,129, issued to Endo, discloses an electrothermal drop-on-demand ink jet printer wherein a power pulse is applied to an electrothermal heater which is in thermal contact with water based ink in a nozzle. The heat from the electrothermal heater can produce a vapor bubble in the ink, which causes an ink drop to be ejected from a small aperture along the edge of the heater substrate. This technology is known as Bubblejet™ (trademark of Canon K.K. of Japan).

U.S. Pat. No. 4,460,728, which issued to Vaught et al. in 1092, discloses an electrothermal drop ejection system which also operates by bubble formation to eject drops in a direction normal to the plane of the heater substrate. As used herein, the term “thermal ink jet” refers to both this system and the system commonly known as Bubblejet™.

Ink nozzles are an essential component of an ink jet printer, arrays of nozzles being typically provided in an in ink jet nozzle plate. The shapes and dimensions of the ink nozzles strongly affect the properties of the ink drops ejected. For example, it is well known in the art that if the diameter of the ink nozzle opening deviates from the desired size, both the ink drop volume and the velocity can vary from the desired values. In another example, if the opening of an ink nozzle is formed with an irregular shape, the trajectory of the ejected ink drop from that ink nozzle can also deviate from the desired direction (usually normal to the plane of the ink jet nozzle plate).

Some known methods of forming ink jet nozzle plates use one or more intermediate molds. One such method uses an electroforming process. The electroforming process uses a mold (or mandrel) overcoated with a continuous conductive film having non-conductive structures that protrude over the conductive film. A metallic ink jet nozzle plate is formed using such a mold (or mandrel) by electroplating onto the conductive film. Over time, the metallic layer grows in thickness. The ink nozzles are defined by the non-conductive structures. One difficulty associated with the above method is the need for the intermediate molds or mandrels. The intermediate molds increase the number of steps in the fabrication process. It is well known in the field of micromachining, that the manufacturing variability increases with the number of the steps in the fabrication process. Since the ink jet nozzle plate comprises structures of small and critical dimensions, it is highly desirable to develop a fabrication process that has fewer number of fabrication steps and does not require the use of intermediate molds or mandrels.

A further need for ink jet nozzles in an ink jet printing apparatus is optimization of the nozzle shape. It is well known in the art that the inside surfaces of an ink nozzle can exist in cone, cylindrical, or toroidal shapes with the axis of symmetry generally in the direction of drop ejection. Furthermore, the ink nozzle cross-section perpendicular to the direction of drop ejection can be circular, square or triangular. The structural designs of the ink nozzles can strongly affect the dynamics of the ink fluid during ink drop ejection and refill and therefore determine to a large extent the properties of the ejected ink drops.

SUMMARY OF THE INVENTION

An object of the present invention is to provide high quality ink jet nozzle plates for use in ink jet printers using manufacturing processes with reduced complexity.

Another object is to provide ink jet nozzle plates directly from semiconductor materials without using intermediate molds or mandrels.

Yet another object is to provide ink jet nozzle plates with high precision and tolerances using conventional semiconductor fabrication techniques.

These objects are achieved by a method for forming an ink jet nozzle plate, comprising the steps of:

a) providing a structure having a top substrate layer, a bottom substrate layer, and a buried layer disposed between the top substrate layer and the bottom substrate layer;

b) selectively etching the top substrate layer to form a plurality of spaced ink cavities in the top substrate layer exposing portions of the buried layer;

c) removing by etching the bottom substrate layer and bonding a base having ink delivery channels over the top substrate layer, with at least one channel corresponding to each ink cavity to thereby form the ink jet nozzle plate; and d) providing a mask having a plurality of openings over the buried layer and etching through such mask openings through the buried layer to the ink cavities to provide at least one bore region corresponding to each ink cavity to provide ink ejection access to such ink cavities so that the buried layer has portions which overhang the ink cavity.

ADVANTAGES

An advantage of the present invention is that ink jet nozzles for ink jet print heads are effectively provided with simplified micromachining processes. It is particularly advantageous in the manufacture of very small or critically dimensioned ink jet nozzle plates to take advantage of silicon processing technology at all possible steps of the process.

A feature of the present invention is that ink jet nozzles are directly fabricated by a method without using one or more intermediate molds. The reduced process complexity permits making very small or critical dimensions for the ink jet nozzle plates.

Another feature of the present invention is that an ink jet nozzle plate produced in accordance with the present invention remains protected from particulate contamination during fabrication.

A still further feature of the present invention is that silicon nozzle plates can be attached to a variety of non-silicon ink actuators.

Another advantage of the present invention is that ink jet nozzles for ink jet print heads are effectively provided with precise tolerances such that the ink drop ejection properties can be optimized.

A further advantage of the present invention is that the fabrication methods in the present invention can produce different shapes in the ink nozzle for improved ink drop ejection.

Yet a further advantage of the present invention is that an ink nozzle can be formed on a protruded portion of an ink jet nozzle plate for providing mechanical flexibility.

A further feature of particular embodiments of the present invention is that the opposing sides of a substrate (or a portion of a substrate) are separately masked and subsequently processed to form an ink jet nozzle plate. The nozzle bore regions and the cavity regions are accurately aligned. The shape and size of the bore and cavity regions can be altered to optimize the performance of the ink drop ejection.

DETAILED DESCRIPTION OF THE INVENTION

The present invention is described in relation to the formation of ink jet nozzle plates with very precisely controlled shapes and dimensions without the use of intermediate molds. Specifically, the present invention relates to rapidly and efficiently providing an ink jet nozzle plate from substrates comprised of three layers.

Figure 1A:
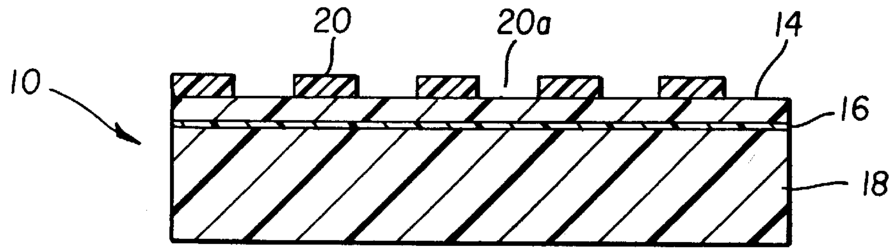
FIGS. 1*a*–1*d* are cross-sectional illustrations of a series of steps that are used in practicing the method of the present invention to produce an ink jet nozzle plate in accordance with a first embodiment of the present invention.
Figure 1B:
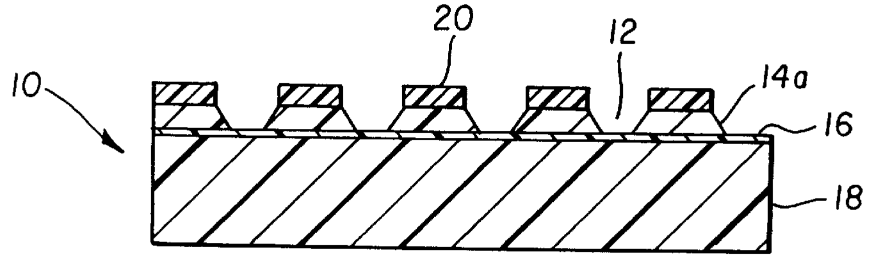

The first embodiment of the present invention is shown in FIGS. 1*a*–1*d*. A composite substrate 10 comprises a top substrate layer 14, a buried layer 16, and a bottom substrate layer 18. Preferably composite substrate 10 is an SOI (silicon-on-insulator) substrate, commercially available for the manufacture of semiconductor devices, for example high voltage silicon devices, which is well known in the art to have precise top substrate layer dimensions, although other composite substrates may also be used. In this preferred case, the top and bottom substrate layers 14 and 18 are made of silicon material and the buried layer 16 is silicon dioxide. Preferably in the practice of the current invention, the thickness of top substrate layer 14 lies in the range of from 1 to 100 microns and the thickness of buried layer 16 is 0.1 to 10 microns, although other thicknesses may be used as well. As shown in FIG. 1*a*, a mask 20 made of photoresist is patterned on top substrate 14 to define openings 20*a* where cavities 12 (shown in FIG. 1*b*) will be formed. A mask made of silicon nitride, deposited for example by low pressure chemical vapor deposition (CVD) and etched with a reactive ion plasma, or of silicon dioxide, made for example by etching a thermal oxide, is also an acceptable mask. In FIG. 1*b*, the composite substrate 10 is subject to a wet etch using an anisotropic etchant such as KOH to form cavities 12. The cavities 12 are defined by inclined walls 14*a* which lie along the [111] crystallographic directions. An area of the buried layer 16 is thereby exposed at the bottom of each cavity 12 after an elapsed time which depends on the thickness of the top substrate layer 14. The area of the buried layer 16 exposed at the bottom of each cavity 12 is precisely determined because of the precise top substrate layer 14 dimensions and because the etch rates of anisotropic etchants such as KOH in silicon are very low in the crystallographic direction [111] perpendicular to inclined walls 14*a* compared to the vertical direction and because the etch rates of anisotropic etchants such as KOH are very low in the buried layer 16.

Figure 1C:
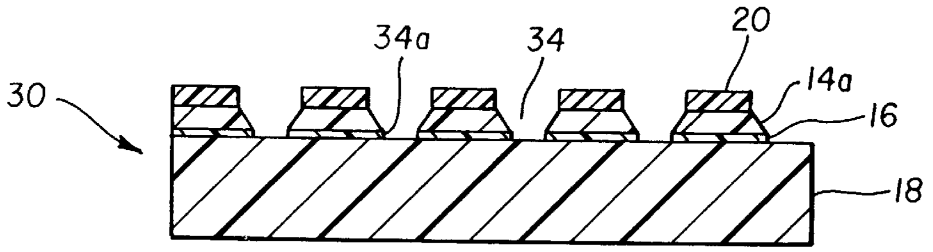

Next, as shown in FIG. 1*c*, the buried layer 16 at the bottom of cavity 12 is etched from the top side of top substrate layer 14, preferably by a reactive ion plasma etch which does not etch the material of top substrate layer 14, to form transfer substrate 30 comprising a plurality of nozzle cavities 34, having vertical walls 34*a* etched in buried layer 16. The dimensions of the openings in buried layer 16, as viewed from the top, are determined only by the areas of the buried layer 16 exposed at the bottom of each cavity 12, which are precisely controlled as previously described. Because the reactive ion etch does not etch the material of top substrate layer 14, the inclined wall 14*a* terminates precisely at the edge of vertical wall 34*a*. The dimensions of the openings in buried layer 16 and the thickness of this layer will determine the size and shape of the openings in the exit side of nozzle plates made in accordance with this invention, as described below.

Figure 1D:
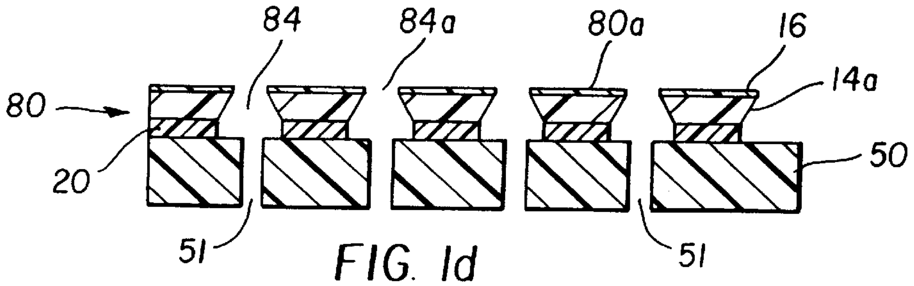

As shown in FIG. 1*d*, a base 50 having ink delivery channels 51 is next bonded to mask 20 by heating the transfer substrate 30 while pressing it in contact with base 50. Alternatively, mask 20 may be removed by an oxygen plasma and other bonding material applied or bonding can be accomplished by other means, for example by anodic bonding techniques, if the base material is glass or silicon, as is well known in the art. Also as shown in FIG. 1*d,* the bottom substrate layer 18 has been removed, for example by wet or dry etching or by grinding, thereby leaving an ink jet nozzle plate 80 bonded to base 50. The removal of the bottom substrate layer 18 is preferably made by mechanical grinding of a portion of bottom substrate layer 18 followed by chemical polishing or by plasma etching of the remaining portion of bottom substrate layer 18. Fluorine based etches are particularly suited to removal of silicon material. The ink jet nozzle plate 80 has an exit surface 80*a* with a plurality of openings 84*a* in exit surface 80*a* and a plurality of bore regions 84 through which the ink drops will be ejected. The bore regions 84 are defined in this embodiment by the vertical walls 34*a,* by the inclined walls 14*a,* and by the patterned mask 20 or other material used in bonding nozzle plate 80 to base 50. In the other embodiments, the bore regions are also those regions through which ink drops will be ejected and are defined by different structures. The precise dimensions provided by this method of nozzle manufacture are advantageous for control of drop size and uniformity in ink jet printing. The use of different materials in the formation of nozzle plates 80 is also advantageous in that it allows control of ink wetting of the exit surface 80*a* as well as meniscus formation and ink refill in the bore regions 84. The present method is also advantageous in this regard in that the use of different materials in the formation of nozzle plates 80 allows selective removal of one or more of those materials to create precisely modified shapes. The use of different materials in the formation of nozzle plates 80 additionally allows selective surface coatings such as organic surfactants or electroplated surface coatings on one or more of the materials to precisely control the hydrophobicity differences between ink contacting surfaces.

FIGS. 2*a*–2*f* illustrate a series of steps to produce an inkjet nozzle plate in accordance with a second embodiment of the present invention. This embodiment allows the formation of openings on the exit surface of a nozzle plate which are located arbitrarily with respect to the nozzle cavities underlying such openings and additionally allows such openings to be of arbitrary shape and number.

Figure 2A:
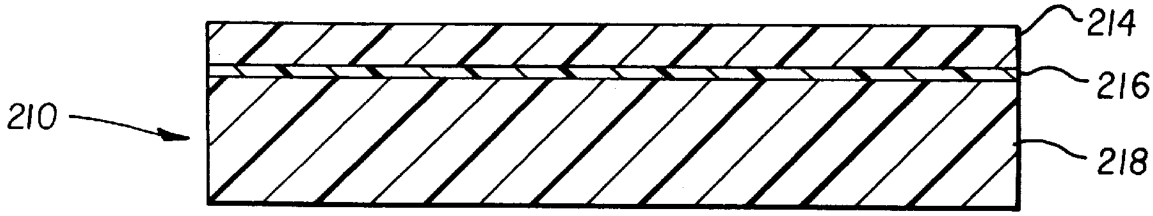
FIGS. 2*a*–2*f* are cross-sectional illustrations of a series of steps that are used in practicing the method of the present invention to produce an ink jet nozzle plate in accordance with a second embodiment of the present invention.

FIG. 2*a* shows a cross-sectional view of a composite substrate 210 comprised of a top substrate layer 214, a buried layer 216, and a bottom substrate layer 218. Preferably, the composite substrate 210 is a silicon-on-insulator (SOI) substrate, commercially available for the manufacture of semiconductor devices such as high-voltage silicon devices, although other composite substrates may also be used. In an SOI composite substrate, the top substrate layer 214 and the bottom substrate layer 218 are made of silicon and the buried layer 216 is silicon dioxide.

Figure 2B:
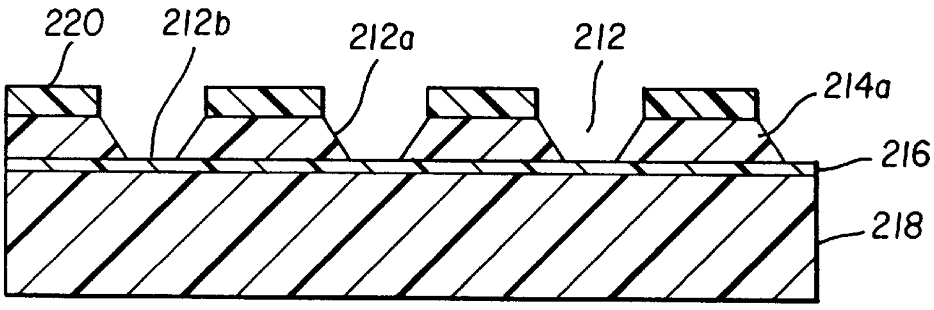

As shown in FIG. 2*b,* a mask 220 has been provided on the top substrate layer, the mask 220 being preferably silicon dioxide made by growing a thermal oxide, although a mask 220 made of silicon nitride, deposited for example by low pressure chemical vapor deposition (CVD), is also an acceptable mask 220. The mask 220 is shown patterned, for example by having been coated with a photo-patternable photoresist, and etched. As shown in FIG. 2*b,* the top substrate layer 214 of composite substrate 210 has been etched, preferably by a crystallographic wet etch comprising an aqueous mixture of potassium hydroxide (KOH), to form recesses 212. The recesses 212 are bounded by inclined walls 212*a* and inner surfaces 212*b* which are exposed surfaces of the buried layer 216. The top substrate layer 214 is thereby modified to become a modified top substrate layer 214*a*. As is well known in the art of semiconductor processing with KOH etching, the inclined walls 212*a* lie along [111] planes of the silicon crystal.

Figure 2C:
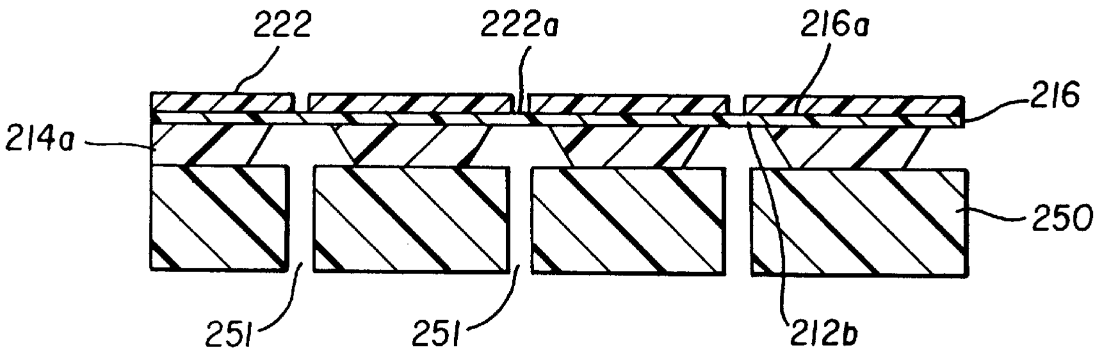

Next, as shown in FIG. 2*c,* modified top substrate layer 214*a* is bonded to a base 250 having ink delivery channels 251, preferably a flat base, in order to facilitate subsequent photolithography. Many possible means of bonding are known in the art of semiconductor processing. A particularly simple means, appropriate for the manufacture of the present invention, is thermal bonding to a photoresist or other polymer film applied, for example, by spin coating to base 250. Anodic bonding of oxide to silicon is also a well known process for the provision of secure bonds, although anodic bonds are permanent in nature. In FIG. 2*c,* the bonding material has not been shown. Also in FIG. 2*c,* mask 220 has been removed, although this step is not required.

After base 250 is bonded to modified top substrate layer 214*a,* bottom substrate layer 218 is removed. The removal of the bottom substrate layer 218 is preferably made by mechanical grinding and chemical or plasma etching of the silicon material. Fluorine based etches are particularly suited to removal of the silicon material without damage to the silicon dioxide material of buried layer 216. FIG. 2*c* shows buried layer 216 oriented upwards. After removal of bottom substrate layer 218, buried layer 216 is coated with a mask 222 patterned with openings 222*a* for subsequent etching. Mask 222 is formed by conventional photolithography on ink jet nozzle plate outer surface 216*a* of buried layer 216 with openings 222*a* centered over inner surfaces 212*b*. As is well known in the art of semiconductor manufacture, the alignment between inner surfaces 212*b* and openings 222*a* can be achieved using infra-red photolithography.

Figure 2D:
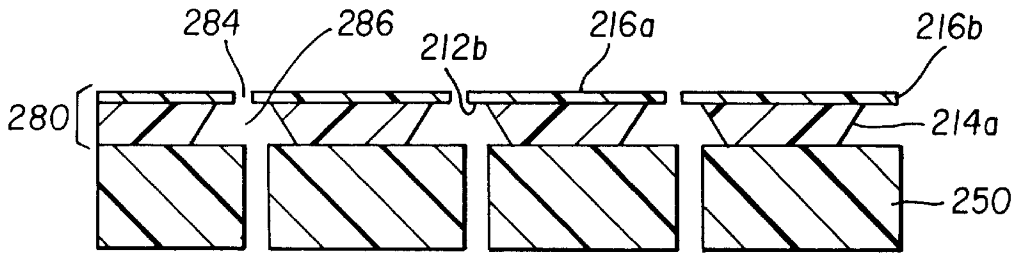
Figure 2E:
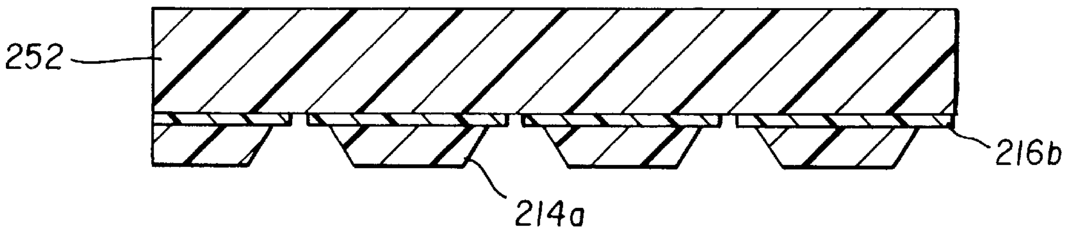

In FIG. 2*d,* buried layer 216 is etched, preferably by reactive plasma etching, to form a modified buried layer 216*b* having a bore region 284 with vertical walls formed in buried layer 216. The combination of modified buried layer 216*b* and modified top substrate layer 214*a* forms an ink jet nozzle plate 280. Cavities 286 correspond to the recesses 212 of FIG. 2*b*. Bore regions 284 correspond to openings 222*a* in FIG. 2*c*. The outer surface of the buried layer 216 is ink jet nozzle plate outer surface 216*a*. The modified buried layer 216*b* has portions including the inner surfaces 212*b* which overhang the ink cavities 286. Because the modified buried layer 216*b* is a different material than modified upper substrate layer 214*a,* the interaction of ink with the surfaces of modified buried layer 216*b* is different than the interaction of ink with the surfaces of cavity 286, depending on the chemical nature of the ink, which is well known to be advantageous in controlling the wetting and refill properties of ink jet nozzle plates. Moreover, because the modified buried layer 216*b* is a different material than modified upper substrate layer 214*a,* it is possible to selectively modify the surfaces of modified buried layer 216*b* by chemical treatment to further provide adjustment of the interaction between inks, for example by selectively coating the oxide surfaces of modified buried layer 216*b* with organic surfactants, as is well known in the art of surface modifications, hydrophobic surfaces are formed. Thereby, by applying such modifications selectively to the top side of modified buried layer 216*b,* it is possible to provide a top surface of modified buried layer 216*b* which is non-wetting to ink while leaving the cavity side of modified buried layer 216*b* wetting to ink, as is the natural tendency of oxide materials.

The ink jet nozzle plate 280 can be used directly on base 250 if base 250 has ink channels 251 so that ink fluids can be supplied to the cavities 286. In this case, the base 250 may also be processed to include drop actuator structures and ink supply manifolds to provide means of ink drop ejection from bore regions 284. Common actuator structures for this purpose include piezoelectric actuators and thermal resistive heaters.

Figure 2F:
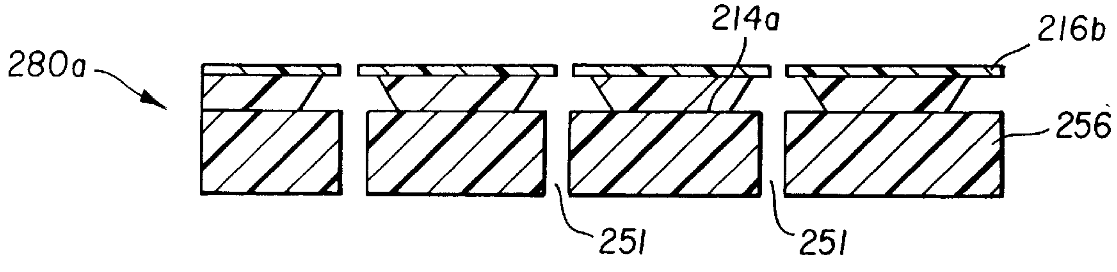

Alternatively, ink jet nozzle plate 280 may be further processed by the steps of providing a transfer substrate 252 (FIG. 2*e*) which is temporarily bonded to the ink jet nozzle plate outer surface 216*a* of modified buried layer 216*b*. The base 250 is then removed from the modified top substrate layer 214*a,* by methods similar to those described above for the removal of bottom substrate layer 218 of FIG. 2*b*. In this case, base 250 need not have ink channels 251 although base 250 should still be preferably a flat base, in order to facilitate subsequent photolithography. The modified top substrate layer 214*a* is then bonded to a prefabricated ink actuator base 256 (FIG. 2*f*), and the transfer substrate 252 is subsequently removed. The ink actuator base 256 in this case would include the structures for actuating the ejection of ink drops from the bore regions 284. Such actuator structure can include a thermal electric heater, used in a thermal ink jet print head, or a piezoelectric actuator, as used in a piezoelectric inkjet print head, as is well known in the art. Proper ink channels and manifolds are also included in the ink actuator base 256. An ink jet nozzle structure 280*a* is thereby provided (FIG. 2*f*).

FIGS. 3*a*–3*e* illustrate a series of steps that provide an ink jet nozzle plate in accordance with a third embodiment of the present invention. The nozzle plate is made from a composite substrate having a buried layer as in the previous embodiments but the nozzle plate surface here provided is of a different material from that of the buried layer 216. In FIGS. 3*a*–3*e,* like names correspond to like parts of FIGS. 2*a*–2*e*.

Figure 3A:
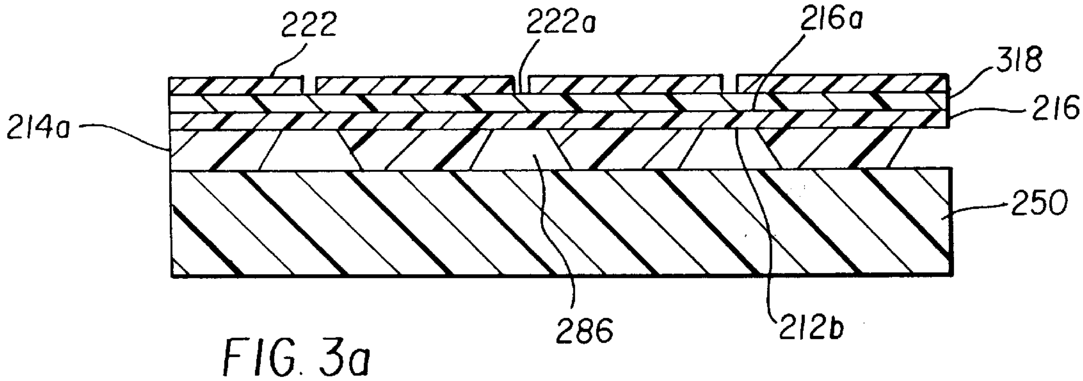
FIGS. 3*a*–3*e* are cross-sectional illustrations of a series of steps that are used in practicing the method of the present invention to produce an ink jet nozzle plate in accordance with a third embodiment of the present invention.
Figure 3B:
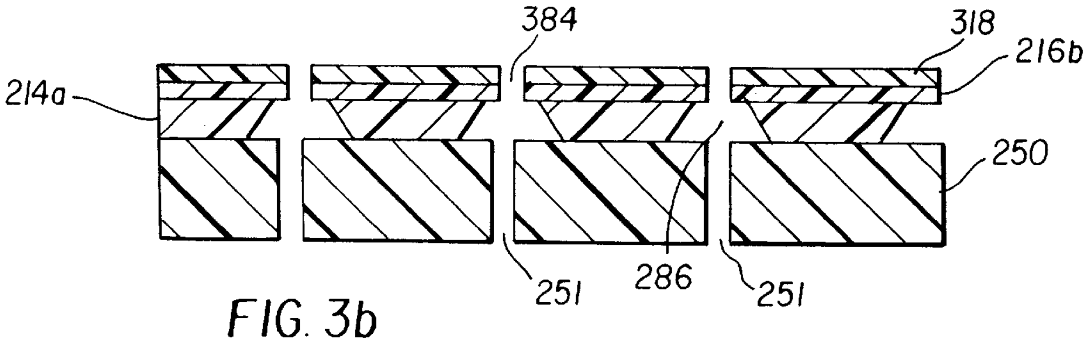

FIG. 3*a* shows a cross-sectional view of a composite substrate, preferably a silicon-on-insulator (SOI) substrate, processed in a manner identical to that discussed in association with FIGS. 2*a*–2*c* of the present invention except that a nozzle plate overcoat 318 has been deposited uniformly on the top surface of buried layer 216 prior to deposition of mask 222 with openings 222*a*. Such a deposited layer may be formed by a variety of thin film deposition techniques, as is well known in the art, and may be comprised of either metals such as titanium or gold or insulators such as silicon nitride, typically used in the manufacture of silicon devices. It is important that either the conductivity of nozzle plate overcoat 318 or the type of etchant that etches nozzle plate overcoat 318 differ from that of buried layer 216. Next, as depicted in FIG. 3*b,* nozzle plate overcoat 318 and buried layer 216 are etched, preferably by a plasma etch, in the regions under the openings 222*a* in mask 222, to form a bore region 384 in nozzle plate overcoat 318 and buried layer 216 and cavities 286 directly under bore regions 384. Although the cavities 286 (FIG. 3*b*) of the present embodiment are of the same shape as the cavities 286 of the previous embodiment (FIG. 2*c*), the bore regions 384 (FIG. 3*b*) can be made to differ substantially from the bore regions 284 of FIG. 2*d* due to the presence of nozzle plate overcoat 318. These differences may include, but are not restricted to, differences in the shapes of the bore region due to the nature of the etches used in forming bore region 384, and to differences in the relative wetting properties of the nozzle plate overcoat 318 compared to those of buried layer 216 due to the choice of the material for nozzle plate overcoat 318.

Figure 3C:
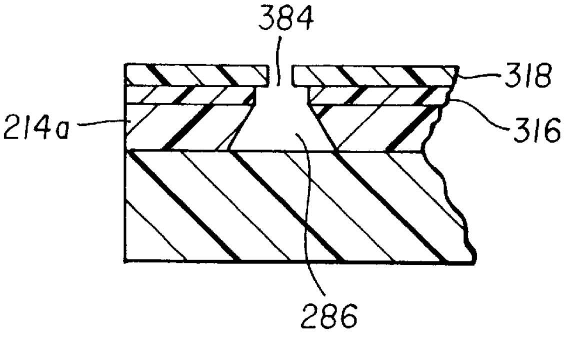
Figure 3D:
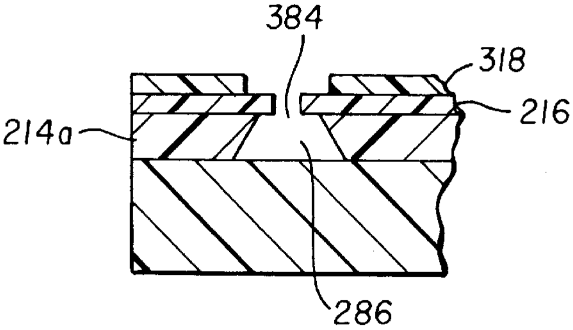
Figure 3E:
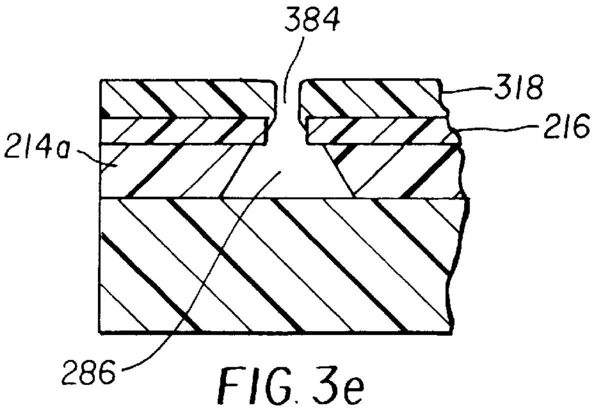

The shape of bore region 384 is shown in FIG. 3*b* as a uniform opening with vertical walls, which is the shape formed by using anisotropic etches, such as reactive ion plasma etches, to etch the buried layer 216 and nozzle plate overcoat 318. This shape, in accordance with the present embodiment, may be altered by further processing. In FIG. 3*c,* the shape of the bore region 384 has been altered from that shown in FIG. 3*b* by additionally etching buried layer 216 using an isotropic etch; whereas in FIG. 3*d,* the shape of the bore region 384 has been further altered from that shown in FIG. 3*c* by isotropically etching nozzle plate overcoat 318. In FIG. 3*e,* the shape of the bore region has been further altered from that shown in FIG. 3*b* by electrolytic deposition of a nozzle plate overcoat 318, for example an overcoat of nickel or a nickel alloy. It is possible to electrolytically deposit material selectively if nozzle plate overcoat 318 is a conductor such as a titanium or polysilicon because buried layer 216 is an insulator and therefore the voltage of nozzle plate overcoat 318 may be independently controlled during electrodeposition. As is well known in the art, the ability to alter the shapes and materials in the bore region 384 of ink jet nozzles is advantageous in controlling both the ejection of ink drops and the refilling of ink in cavities 286. Specifically, the nozzle plate overcoat 318 is preferably non-wetting to the ink fluid so that ink will not flood and form an ink layer on the nozzle plate overcoat 318 during printing. It is well known that an ink layer on the nozzle plate overcoat 318 often causes ink drop ejection to be misdirected and can stop ink ejection altogether.

A fourth embodiment of the present invention is shown in FIGS. 4*a* through 4*i* for making very small or critically dimensioned ink jet nozzle plates which are thinner and more flexible than those of the previous embodiments. Masks are used on opposing sides of the ink jet nozzle plate to form cavities and nozzle bores. Although cavities are described for the simple case of inclined walls produced by wet etching, the shape and size of the cavities can be altered by techniques well known to the art of semiconductor etching.

Figure 4A:
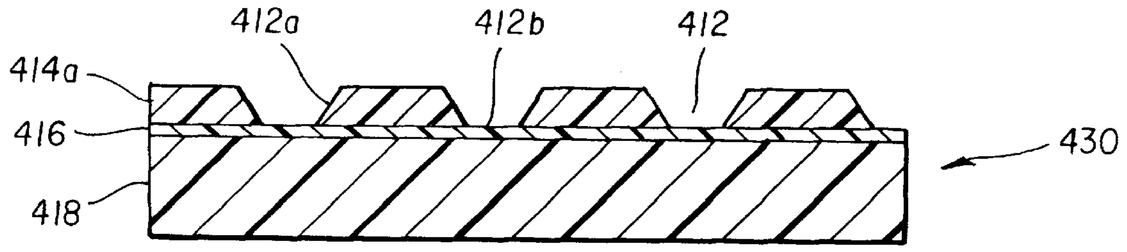
FIGS. 4*a*–4*e* are cross-sectional illustrations of a series of steps that are used in a fourth embodiment of the present invention.

FIG. 4*a* shows a composite substrate 430, comprised of a modified top substrate layer 414*a,* a buried layer 416, and a bottom substrate layer 418, made identically to the structure discussed in FIG. 2*a*. Composite substrate 430 is an SOI (silicon-on-insulator) substrate, commercially available for the manufacture of semiconductor devices, for example high voltage silicon devices, the top and bottom substrate materials of which are silicon and the buried layer 416 of which is silicon dioxide. Modified top substrate layer 414*a* has been formed as in the previous embodiment by etching a first etched region 412, preferably using a crystallographic wet etch, having an inclined wall 412*a* and a nozzle plate inner surface 412*b* which is an exposed surface of buried layer 416. Buried layer 416 provides a highly selective etch stop for the etch used to form first etched regions 412.

Figure 4B:
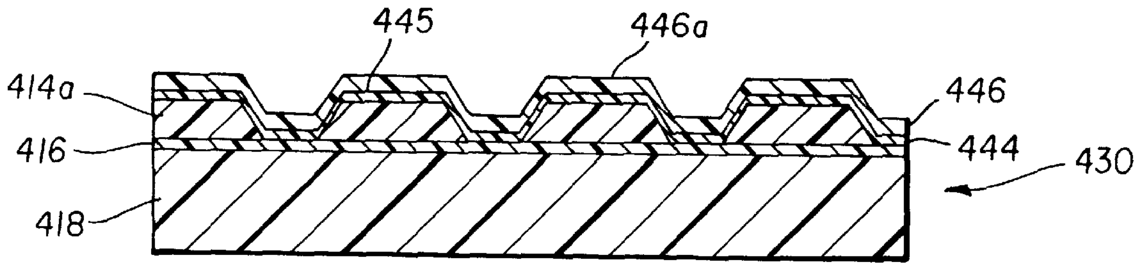

As shown in FIG. 4*b,* after formation of first etched regions 412, a seed layer 444, made of a conductive material such as evaporated titanium, copper, or chrome, is uniformly deposited, for example by sputtering or evaporation, over the top surfaces of the structure of FIG. 4*a*. Next, an electrolytically deposited plate layer 446, made of nickel, gold, or metallic alloys, is provided conformally over seed layer 444, a process well known in the art of electrolytic deposition. Plate layer 446 and seed layer 444 together comprise a nozzle plate layer 445. As is known in the art, nozzle plate layer 445 can also be deposited by means other than the electrodeposition process described, such as sputter deposition of a single layer, and does not have to be comprised of multiple layers.

Figure 4C:
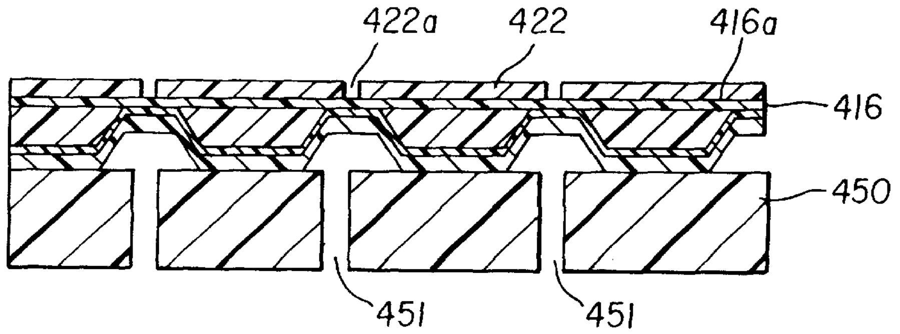
Figure 4D:
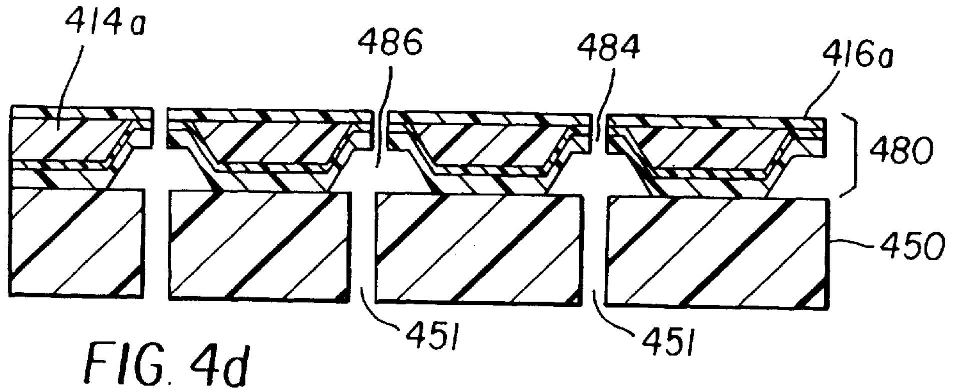

As shown in FIG. 4*c,* a base 450, optionally having ink delivery channels 451, is next bonded to top layer 446*a* of plate 446. A particularly simple means, appropriate for the manufacture of the present invention, is thermal bonding to a polymer film such as a photoresist, which is dissolvable in an organic solvent, applied by spin coating to base 450. Also as shown in FIG. 4*c*, bottom substrate layer 418 has been removed, preferably by mechanical grinding and chemical or plasma etching of the silicon material comprising bottom substrate layer 418. Fluorine based etches are particularly suited to removal of the silicon material of bottom substrate layer 418 without damage to the silicon oxide material of buried layer 416. A nozzle plate outer surface 416*a* is thereby formed without loss of the silicon oxide material comprising buried layer 416. The structure of FIG. 4*c* is shown with nozzle plate outer surface 416*a* oriented upwards. Also as shown in FIG. 4*c*, a nozzle mask 422 has been formed by conventional photolithography over nozzle plate outer surface 416*a* having openings 422*a* over nozzle plate inner surfaces 412*b* of FIG. 4*a*. Buried layer 416, plate 446 and seed layer 444 are next etched anisotropically through openings 422*a* (FIG. 4*d*) thereby forming an ink jet nozzle plate 480 having bore regions 484 and cavities 486 in locations corresponding to ink delivery channels 451.

Figure 4E:
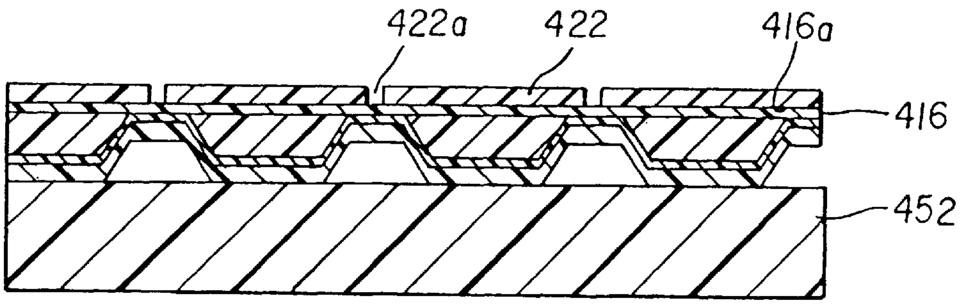
Figure 4F:
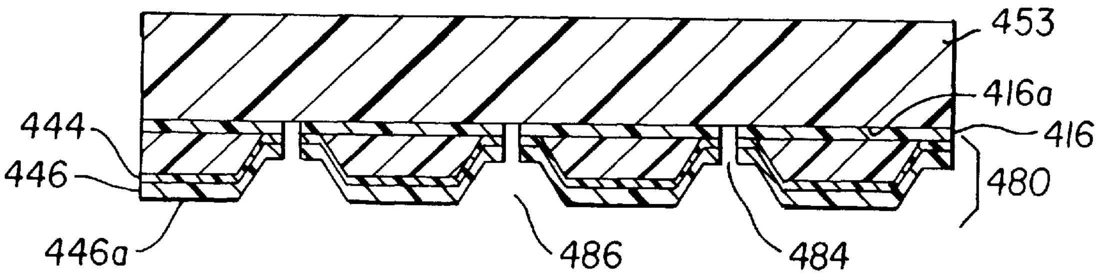
FIGS. 4*f*–4*i* are cross-sectional illustrations of a series of steps that are used in a modification of the fourth embodiment of the present invention to control surface wetting.

Alternatively, the structure as shown in FIG. 4*b* can be bonded to a first transfer substrate 452 rather than to base 450, as shown in FIG. 4*e*. First transfer substrate 452 need not contain ink delivery channels, but it should be flat and shaped so as to enable conventional photolithography processes to be performed on layers bonded to it. As shown in FIG. 4*e*, outer surfaces 446*a* (FIG. 4*b*) have been bonded to transfer substrate 452 and bottom substrate layer 418 has been removed, preferably by mechanical grinding and chemical or plasma etching of the silicon material comprising bottom substrate layer 418. A nozzle plate outer surface 416*a* (FIG. 4*c*) is thereby formed without loss of the silicon oxide material comprising buried layer 416. The structure of FIG. 4*e* is shown with nozzle plate outer surface 416*a* oriented upwards. Also as shown in FIG. 4*e*, a nozzle mask 422 has been formed by conventional photolithography over nozzle plate outer surface 416*a* having openings 422*a* located over nozzle plate inner surfaces 412*b* of FIG. 4*a*.

Figure 4G:
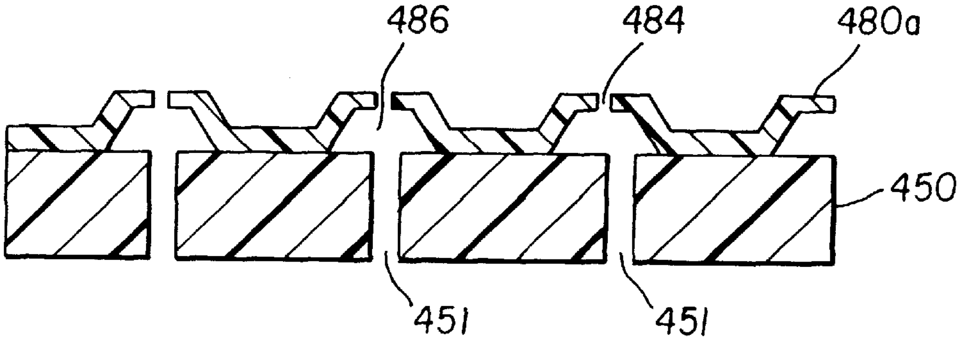

Buried layer 416, plate 446 and seed layer 444 are next etched anisotropically through openings 422*a* (FIG. 4*f*)) and nozzle plate outer surface 416*a* is bonded to a second transfer substrate 453. Finally, as shown in FIG. 4*g*, surface 446*a* of plate layer 446 is bonded to a base 450 having ink delivery channels 451, thereby forming an ink jet nozzle plate 480 having bore regions 484 and cavities 486 in locations corresponding to ink delivery channels 451. This alternative is appropriate when base 450 cannot be easily subjected to conventional photolithographic processing due to reasons of shape, size, or material construction. Bonding of surface 446*a* of plate layer 446 base 450 may be accomplished by a variety of bonding techniques, an acceptable method in accordance with the present invention being the use of a polymer film which does not dissolve in the solvent capable of dissolving the bonding material used to bond base surface layer 416*a* (FIG. 4*f*) to first transfer substrate 452. For example, if the material used to bond surface layer 416*a* to second transfer substrate 453 is comprised of water insoluble photoresist, the polymer film used to bond surface 446*a* of plate layer 446 to transfer substrate 453 is preferably a water soluble film such as polyvinyl alcohol, and the preferred means of removing first transfer substrate 452 is immersion in an organic solvent such as acetone which dissolves photoresist, as is well known in the art.

As shown in FIG. 4*g*, buried layer 416, modified top substrate layer 414*a* and seed layer 444 may be optionally removed by sequential etching to provide flexible ink jet nozzle plate 480*a*. Removal of these layers provides a thin wall ink jet nozzle plate which can be deformed to various degrees depending on the thickness and material of plate layer 446. Mechanical flexibility can be advantageous in ink jet printing applications.

Figure 4H:
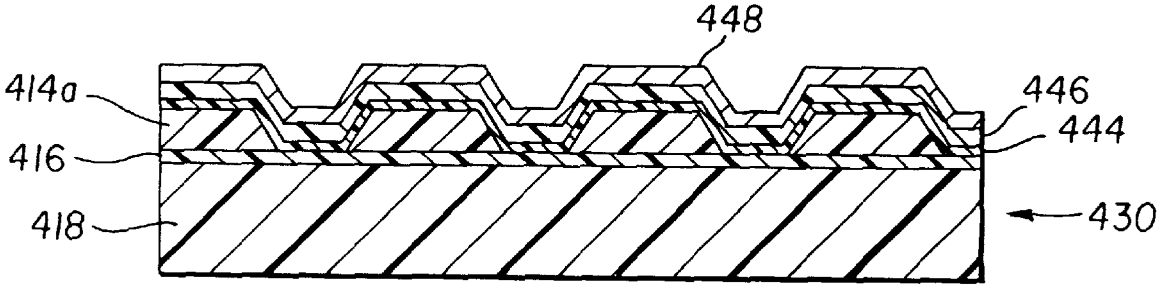
Figure 4I:
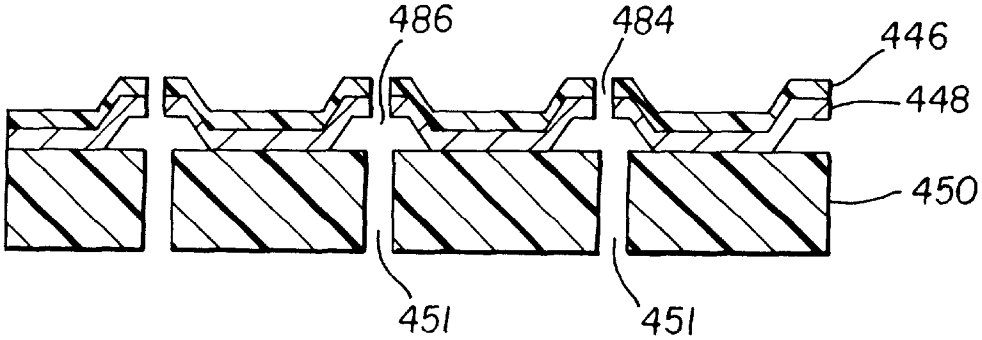

FIGS. 4*h* and 4*i*, with like numbers corresponding to like parts in FIGS. 4*b* and 4*g* respectively, show a nozzle plate made in a manner essentially identical to that of the current embodiment except that an additional outer plate 448 has been deposited immediately after deposition of plate 446. It is understood that the materials for the outer plate 448 can be optimized so that the outer plate 448 is properly passivated for the ink contained in the ink cavity 286, thereby providing enhanced ink stability. The nozzle plate shown in FIG. 4*i* is comprised of at least two layers. As described previously in the embodiment of FIGS. 3*c*–3*e*, a nozzle plate made of more than one layer is advantageous for control of the wetting and refill characteristics of ink in cavities 486 of FIG. 4*i*.

Figure 5A:
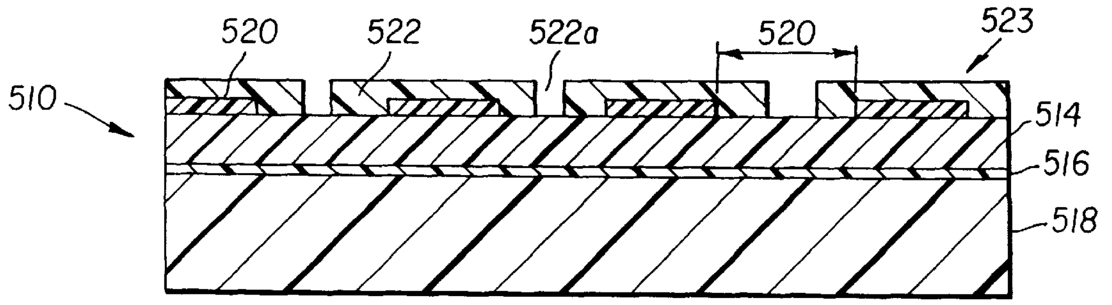
FIGS. 5*a*–5*d* illustrate a series of steps that are used in a fifth embodiment of the present invention.
Figure 5B:
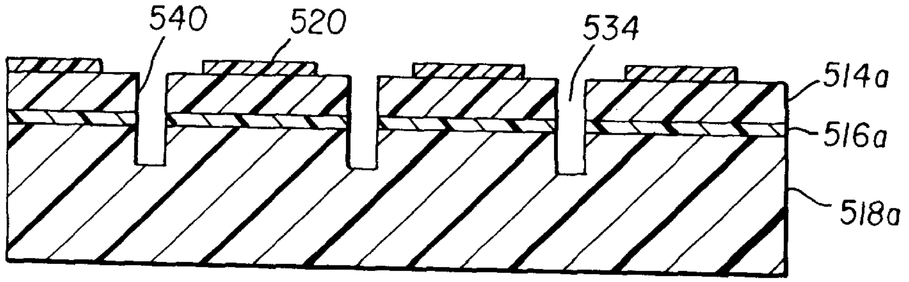

In a fifth preferred embodiment of the current invention, a nozzle plate is made with a reduced number of process steps; and the nozzle bores are made by etching through the top substrate layer of a composite substrate. Referring now to FIG. 5*a*, a composite substrate 510, comprised of a top substrate layer 514, a buried layer 516, and a bottom substrate layer 518 is provided with a photolithographically defined composite mask 523 comprising a bore mask 522 having openings 522*a* and a cavity mask 520 having openings 520*a*. Cavity mask 520 is preferably made of silicon nitride and bore mask 522 is preferably photoresist, coated and patterned by conventional lithography after definition of cavity mask 520. Preferably, composite substrate 510 is an SOI (silicon-on-insulator) substrate. Bore mask 522 defines openings 522*a* for an etched region 534. As shown in FIG. 5*b*, an anisotropic etch is next performed which extends entirely through top substrate layer 514, buried layer 516, and a portion of bottom substrate layer 518 having a vertical wall 540. Thereby top substrate layer 514 is altered to become modified top substrate layer 514*a*, buried layer 516 is altered to become modified buried layer 516*a*, and bottom substrate layer 518 is altered to become modified bottom substrate layer 518*a*. Typically, the layer thickness of the top substrate layer 514, buried layer 516, and bottom substrate layer 518 are respectively about 10 microns, 5 microns, and 600 microns respectively and the portion of the etch extending into bottom substrate layer 518 is about 10 microns in depth. However, the thickness are not required to have these values, and more generally may lie in the range of from 2 to 100, 2 to 50, and 200 to 1000 microns respectively, with the portion of the etch extending into bottom substrate layer 518 preferably lying in the range of from 1 to 200 microns. The anisotropic etch is typically a high density reactive ion plasma etch, the gas composition of which is varied as layers of different types are etched, as is well known in the art of semiconductor processing for the preferred materials.

Figure 5C:
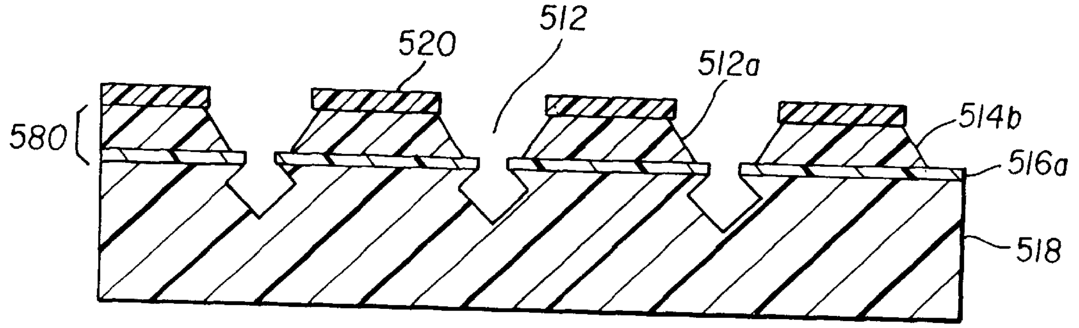
Figure 5D:
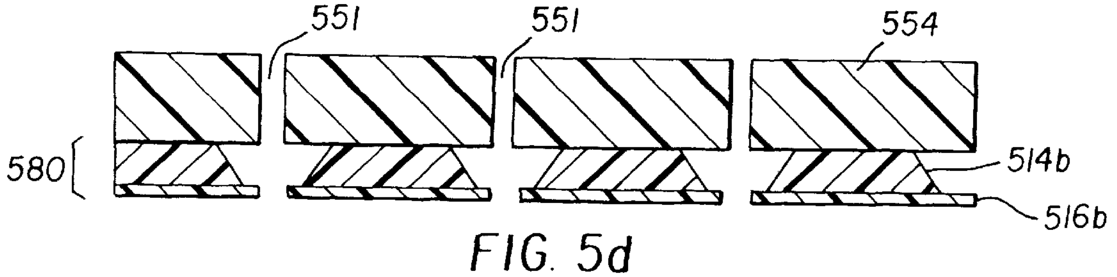

As shown in FIG. 5*c*, the openings 520*a* (shown in FIG. 5*a*) are substantially wider than the openings 522*a* and are approximately centered over those openings. Referring now to FIG. 5*c*, where next, a wet etch is performed, preferably a crystallographic wet etch comprising an aqueous mixture of potassium hydroxide, to form inclined walls 512*a* in a first etched region 512, thereby altering modified top substrate layer 514*a* to become modified top substrate layer 514*b*. As is well known in the art of semiconductor processing, the angles of the inclined walls lie along [111] planes of silicon. Modified top substrate layer 514*b* and modified buried layer 516*a* together comprise an ink jet nozzle plate 580. At this stage, the ink jet nozzle plate 580 is complete and may be directly bonded to a final device substrate 554 as shown in FIG. 5*d*, having ink delivery channels 551. The final device substrate 554 may be, for example, an ink jet print head of any type. The bonding of ink jet nozzle plate 580 to its desired location may be accomplished by any number of a variety of techniques such as epoxy bonding or metal bonding, as is well known in the art. After bonding to final device substrate 554, modified bottom substrate layer 518*b* (FIG. 5*c*) may be removed by etching or by a combination of grinding and etching, as is well known in the art of wafer thinning, or the wafer may be thinned by grinding before bonding to the final device substrate. The preferred embodiment in accordance with this advantageously provides an accurately dimensioned nozzle made with a minimal number of processing steps from a composite substrate and able to be transferred simply and directly to a final device substrate. A feature of this embodiment is that lithography is required only on one side of the composite substrate 510.

Figure 6A:
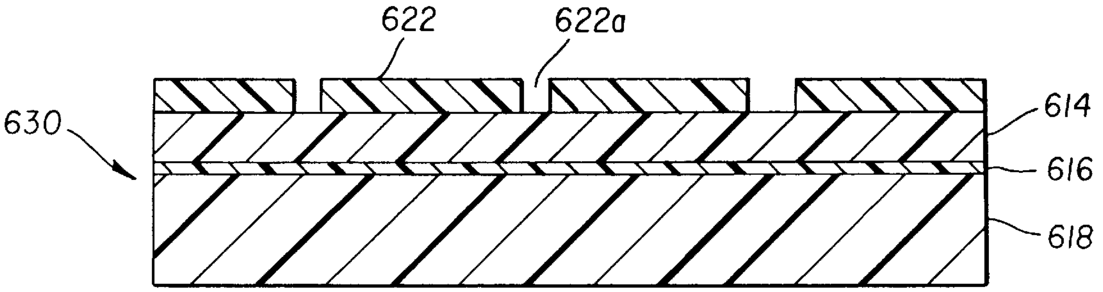
FIGS. 6*a*–6*e* illustrate a series of steps that are used in a sixth embodiment of the present invention.
Figure 6B:
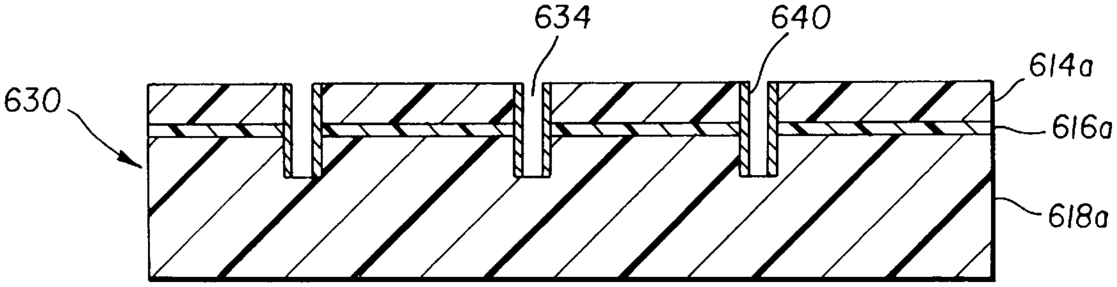

In a sixth preferred embodiment, an ink jet nozzle plate is made from thin film materials deposited on an SOI composite substrate 630 processed in accordance with the descriptions corresponding to FIGS. 6*a*–6*e*. Referring to FIG. 6*a*, a composite substrate 630, comprised of a top substrate layer 614, a buried layer 616, and a bottom substrate layer 618 is provided with a photolithographically defined bore mask 622 having openings 622*a*, similar to the case of the previous embodiment. Preferably, composite substrate 630 is an SOI substrate, commercially available for the manufacture of semiconductor devices, the top and bottom substrate materials of which are silicon and the buried layer 616 of which is silicon dioxide. Mask 622 is preferable a silicon dioxide mask, made by depositing or growing silicon oxide, coating the oxide with a photopatternable photoresist, photolithographically defining openings in the photoresist, and then removing by etching the oxide in selected regions to form openings 622*a*. As shown in FIG. 6*b*, an anisotropic etch is next performed which extends entirely through top substrate layer 614, buried layer 616, and a portion of bottom substrate layer 618, forming bore regions 634. Thereby top substrate layer 614 is thereby altered to become modified top substrate layer 614*a*, buried layer 616 is altered to become modified buried layer 616*a*, and bottom substrate layer 618 is altered to become modified bottom substrate layer 618*a*. Typically, the layer thicknesses of the top substrate layer 614, buried layer 616, and bottom substrate layer 618 are respectively about 10 microns, 5 microns, and 600 microns respectively and the portion of the etch extending into bottom substrate layer 618 is about 10 microns in depth. Layer thickness are not required to have these values, and more generally may lie in the range of from 2 to 100, 2 to 50, and 200 to 1000 microns respectively, with the portion of the etch extending into bottom substrate layer 618 preferably lying in the range of from 1 to 200 microns. The anisotropic etch is typically a high density reactive ion plasma etch, the gas composition of which is varied as layers of different types are etched, as is well known in the art of semiconductor processing for the preferred materials. After etching top substrate layer 614, buried layer 616, and a portion of bottom substrate layer 618, a bore liner layer 640 of a material resistant to wet silicon etching is conformally deposited, for example a 3000 Angstrom layer of silicon nitride may be so deposited by low pressure chemical vapor deposition. Bore liner layer 640 is then etched anisotropically to remove it entirely from horizontally disposed surfaces in FIG. 6*b*. It is understood that for some applications, it is desirable to keep the bore liner layer 640 as part of the ink nozzle bore region so that ink meniscus can be pinned at the edge of the bore liner layer 640. It is well known in the art that pinning ink meniscus at fixed location is desirable for ink ejection reliability. Bore liner 640 may also be made by growing a thermal oxide in bore regions 634 and etching it anisotropically.

Figure 6C:
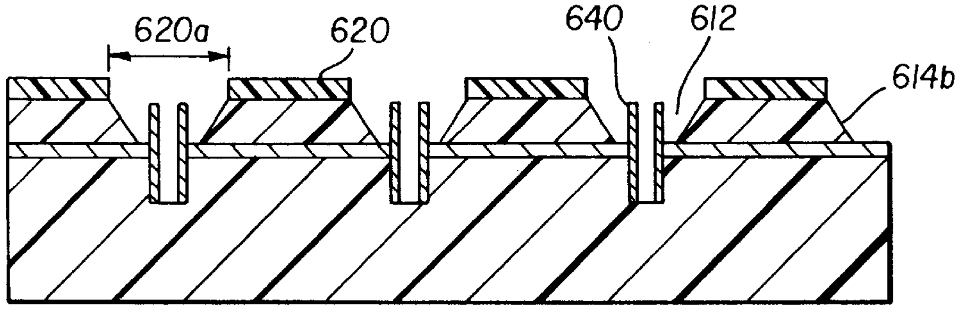

As shown in FIG. 6*c*, mask 622 is removed by etching and a cavity mask 620 having openings 620*a* aligned with openings 622*a* is next provided by using conventional photolithography to define openings in photoresist. Alternatively, cavity mask 620 may be provided as part of a composite mask as described in the previous embodiment (FIG. 5*a*).

Figure 6D:
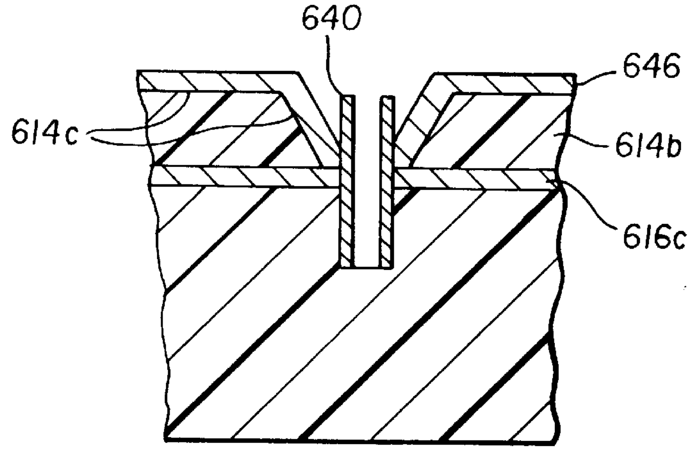

As shown in FIG. 6*c*, the openings 620*a* are substantially wider than the openings 622*a* and are positioned over openings 622*a*. Also as shown in FIG. 6*b* and 6*c*, the vertical portions of bore liner layer 640 are not substantially etched, as is well known in the art of anisotropic etching. Next, a wet etch is performed, preferably a crystallographic wet etch comprising an aqueous mixture of potassium hydroxide, to form exposed surfaces 614*c* (FIG. 6*d*) in an etched region 612 (FIG. 6*c*), thereby again altering modified top substrate layer 614*a* to become modified top substrate layer 614*b*. As is well known in the art of semiconductor processing, the angles of the exposed surfaces 614*c* lie along [111] planes of silicon as shown in FIG. 6*d* where the silicon substrate is of standard [100] orientation.

Next, ink jet nozzle plate layer 646, preferably made of a metal such as gold, is deposited by electrolytic deposition on the exposed surfaces 614*c* (FIG. 6*d*) of modified top substrate 614*b*. Any deposition of material on surfaces of modified bottom substrate layer 618*a* can be optionally prevented by electrically biasing modified bottom substrate layer 618*a*, as is well known in the art of electrodeposition. To facilitate release of the electrolytically deposited material of ink jet nozzle plate 646, a thin layer (not shown) of semiconducting carbon can be optionally deposited prior to electrolytic deposition of ink jet nozzle plate layer 646, for example 100 A of amorphous carbon deposited by plasma decomposition of a hydrocarbon gas such as $CH_4$.

Figure 6E:
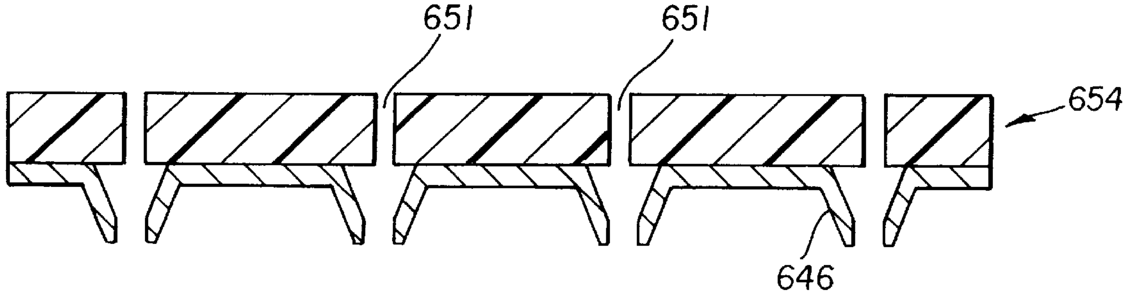

At this stage, the ink jet nozzle plate layer is complete and may be directly transferred to a final device substrate 654 having ink delivery channels 651, as shown in FIG. 6*e*. After transfer, modified bottom substrate layer 618*a*, modified buried layer 616*a*, modified top substrate layer 614*b*, and bore liner 640 are removed, for example by wet etching. The final device substrate 654 may be, for example, an ink jet print head channel array, a device know in the art as requiring attached ink jet nozzle plates. The bonding of ink jet nozzle plate layer 646 to its desired location may be accomplished by any number of a variety of techniques such as epoxy bonding or metal bonding, not the subject of the current invention. After bonding to final device substrate 654, modified bottom substrate layer 618*a* may be removed by etching or by a combination of grinding and etching, as is well known in the art of wafer thinning, or the wafer may be thinned by grinding before bonding to the final device substrate 654, as shown in FIG. 6*e*.

The above preferred embodiment advantageously provides very small and accurately dimensioned orifices made from materials such as electrolytically deposited materials which may be transferred simply and directly to a final device substrate.

Figure 7A:
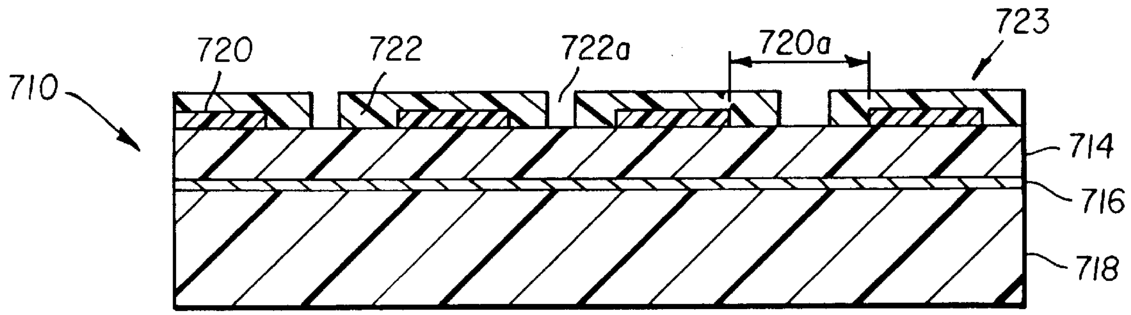
FIGS. 7*a*–7*f* illustrate a series of steps that are used in a seventh embodiment of the present invention.

In a seventh preferred embodiment, an ink jet nozzle plate is formed in a simple manner by a process using a buried shadow mask to permit a wide range of deposition conditions for the materials used for the nozzle plate. Referring to FIG. 7*a,* a composite substrate 710, comprising a top substrate layer 714, a buried layer 716, and a bottom substrate layer 718, is provided with a photolithographically defined bore mask 722, having openings 722*a.* As in the case of the previous embodiment, composite substrate 710 is preferably an SOI substrate. As shown in FIG. 7*a,* mask 722, preferably photoresist, is part of a composite mask 723 which includes cavity mask 720 having openings 720*a,* similar to the composite mask of the previous embodiment.

Figure 7B:
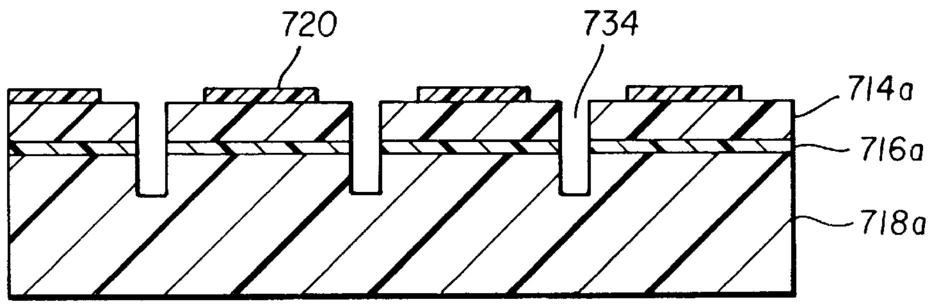

As shown in FIG. 7*b,* an anisotropic etch is next performed which extends entirely through top substrate layer 714, buried layer 716, and a portion of bottom substrate layer 718 to form bore etch region 734. Thereby top substrate layer 714 is altered to become modified top substrate layer 714*a,* buried layer 716 is altered to become modified buried layer 716*a,* and bottom substrate layer 718 is altered to become modified bottom substrate layer 718*a.* Typically, the layer thickness of the top substrate layer 714, buried layer 716, and bottom substrate layer 718 generally may lie in the range of from 2 to 100, 2 to 50, and 200 to 1000 microns respectively. The anisotropic etch is typically a high density reactive ion plasma etch, the gas composition of which is varied as layers of different types are etched as is well known in the art of semiconductor processing for the preferred materials.

Figure 7C:
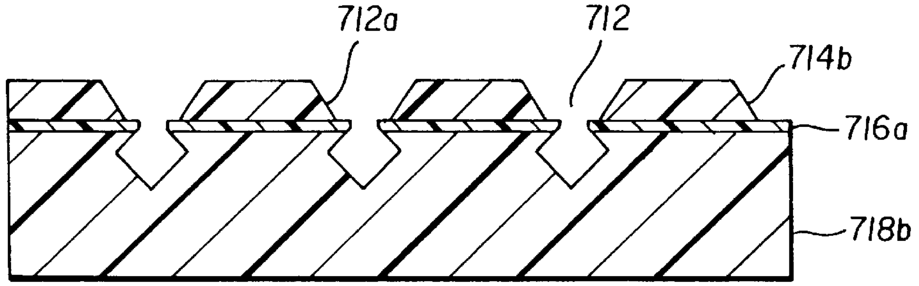
Figure 7D:
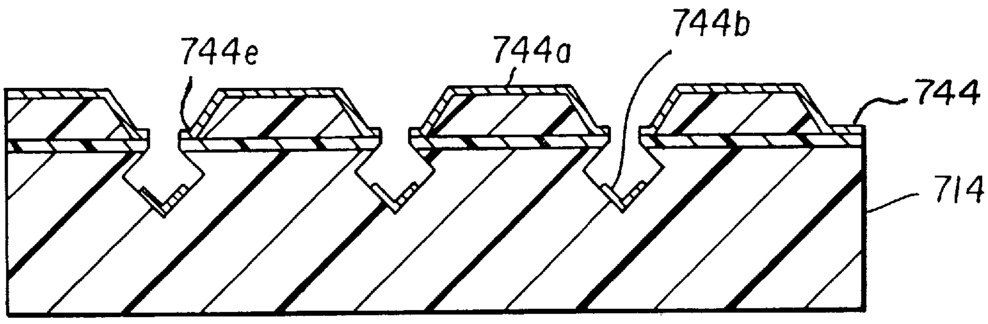
Figure 7E:
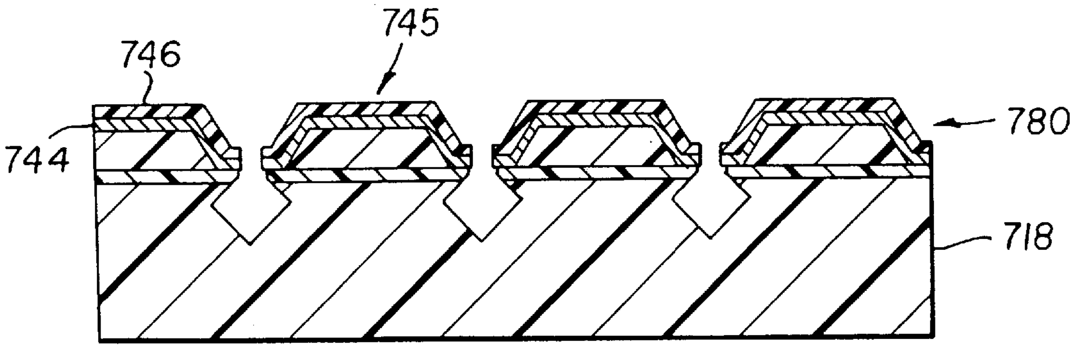

As shown in FIG. 7*c,* mask 722 is removed and the cavity mask 720 thereby exposed is used to mask modified top substrate 714*a* so that modified top substrate 714*a* and modified substrate 718*a* can be etched anisotropically to form etched regions 712. Mask 720, typically silicon nitride, is provided as part of a composite mask 723 of FIG. 7*a.* The etch is preferably a crystallographic wet etch comprising an aqueous mixture of potassium hydroxide, to form inclined walls 712*a* in anisotropically etched region 712, thereby altering modified top substrate layer 714*a* to become modified top substrate layer 714*b* and altering modified bottom substrate layer 718*a* to become modified bottom substrate layer 718*b.* Other etches, such as dry fluorine based plasma etches, are also useful in accordance with the present invention in forming etched regions 712. Next, as shown in FIG. 7*d* and 7*e* a seed layer 744, preferably a metal such as nickel or gold, has been deposited, for example by evaporation. A portion of seed layer 744 is horizontally disposed forming a horizontal region 744*e* where the seed layer contacts modified buried substrate 716*a.*

Modified buried layer 716*a* and modified bottom substrate layer 718*b* act as a buried shadow mask as will be appreciated by one skilled in the art of thin film deposition, separating deposited seed layer 744 into an upper portion 744*a* and a lower portion 744*b,* as shown in FIGS. 7*d,* and 7*e.* Deposition of the seed layer may be preceded by deposition of a thin release layer (not shown) such as oxide or amorphous carbon, as is well known in the art of silicon micromachining. For example, 100 A of amorphous carbon can be deposited by plasma decomposition of a hydrocarbon gas such as $CH_4$.

Figure 7F:
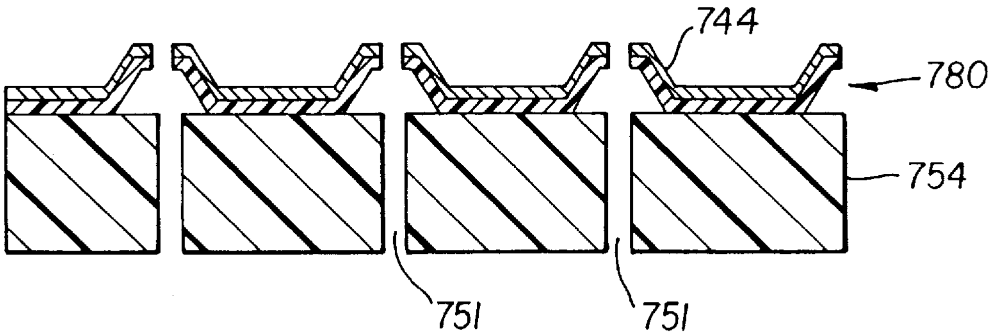

As shown in FIG. 7*e,* if a thicker ink jet nozzle plate is desired, plate layer 746 can be deposited, preferably by electrolytic or electroless deposition, along the exposed surfaces of upper and lower portions 744*a* and 744*b.* Any deposition of material on surfaces of lower portion 744*b* can be optionally prevented during electrolytic deposition, since the potential of lower portion 744*b* can be independently controlled during electrolytic deposition, as is well known in the art. By controlling this potential, removal of lower portion 744*b* may also be achieved, as shown in FIG. 7*e.* Deposited seed layer 744 alone or in combination with plate material 746, as shown in FIG. 7*f,* comprise ink jet nozzle plate 780. Seed layer 744 and plate material 746 form a nozzle plate 745 (FIG. 7*e*). However, nozzle plate 745 can also be made as a single layer by a deposition process such as evaporation of an appropriate material such as gold or titanium.

At this stage, the ink jet nozzle plate 780 is complete and may be directly transferred to a final device substrate 754 having ink delivery channels 751, as shown in FIG. 7*f.* The final device substrate 754 may be, for example, an ink jet print head channel array, a device known in the art as requiring attached ink jet nozzle plates. The bonding of ink jet nozzle plate 780 to its desired location may be accomplished by any number of a variety of techniques such as epoxy bonding or metal bonding, not the subject of the current invention. After bonding to final device substrate 754, modified bottom substrate layer 718*b* may be removed by etching or by a combination of grinding and etching, as is well known in the art of wafer thinning, or the wafer may be thinned by grinding before bonding to the final device substrate.

The preferred embodiment in accordance with this invention provides very small and accurately dimensioned orifices made from non-silicon processing materials such as electrolytically deposited materials which may be transferred simply and directly to a final device location.

In yet another preferred embodiment of the present invention, an ink jet nozzle plate is transferred and bonded to a base with the bore openings of the nozzle plate sealed during the transfer and bonding operation. In accordance with this invention, contamination from particulates is reduced.

Figure 8A:
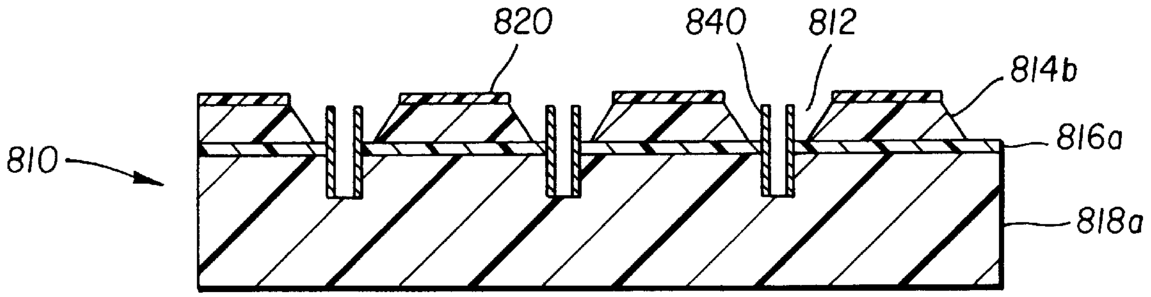
FIGS. 8*a*–8*i* are cross-sectional illustrations of a series of steps that are used in an eighth embodiment of the present invention.
Figure 8B:
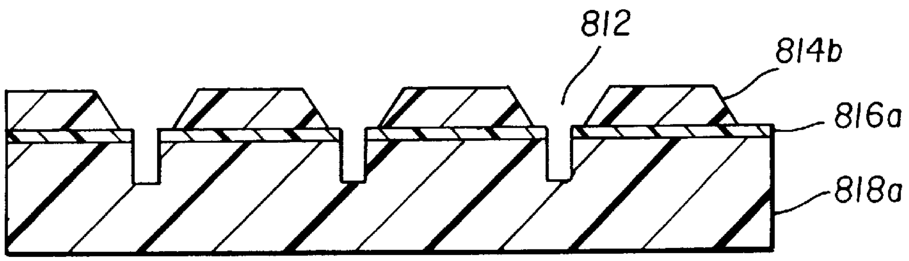
Figure 8C:
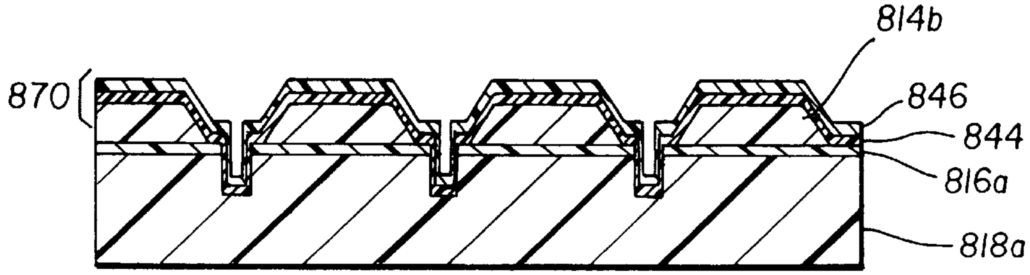

Referring to FIG. 8*a,* a composite substrate 810 has been processed in a manner identical to the process described in association with FIGS. 6*a*–6*c* to form a modified top substrate layer 814*b,* a cavity mask 820, an etched region 812, a modified buried layer 816*a,* a modified bottom substrate layer 818*a,* and a bore liner 840, analogous to modified top substrate layer 614*b,* cavity mask 620, etched region 612, modified buried layer 616*a,* modified bottom substrate layer 618*a,* and bore liner 640 of FIG. 6*c.* In accordance with the next steps of this embodiment, as shown in FIG. 8*b,* cavity mask 820 and bore liner 840 are removed by selective etching, preferably wet etching for the case of bore liner 840 which is preferably made of silicon nitride. The wet etch for silicon nitride does not remove the silicon material of modified top and bottom substrate layers 814*b* and 818*a.* Then, as shown in FIG. 8*c,* a seed layer 844, preferably a metal, is deposited over the exposed surfaces of modified top substrate layer 814*b,* modified buried layer 816*a,* and modified bottom substrate layer 818*a.* For example a nickel or gold thin film can be deposited by sputtering. Then a plate layer 846, preferably a metal, is subsequently deposited, preferably by electrolytic deposition or by electroless deposition. If it is desired to facilitate release of the seed layer 844 and electrolytically deposited plate layer 846, a thin layer (not shown) of semiconducting carbon can be deposited prior to deposition of seed layer 844, for example 100 A of amorphous carbon can be deposited by plasma decomposition of a hydrocarbon gas such as $CH_4$. Plate layer 846 in combination with seed layer 844 comprise sealed inkjet nozzle plate 870. It is understood that sealed ink jet nozzle plate 870 is not required to be comprised of more than a single layer and that as an alternative method of fabrication, a single material, for example gold or titanium, could have been deposited by sputtering to form sealed ink jet nozzle plate 870.

Figure 8D:
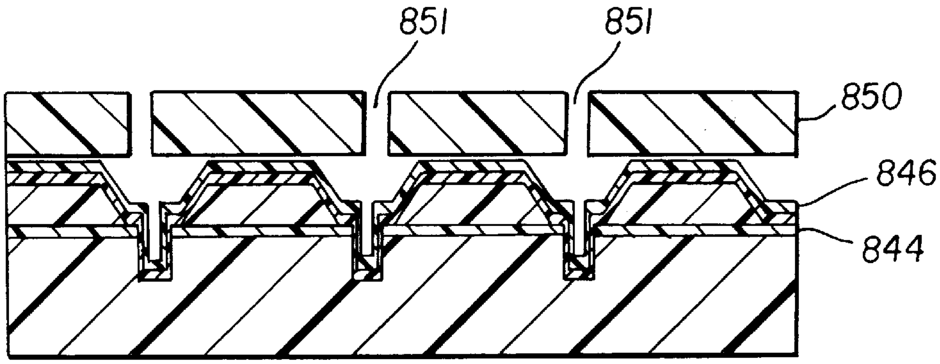

At this stage, the sealed ink jet nozzle plate 870 is complete and its top surface may be directly bonded to a base 850 having ink delivery channels 851, as shown in FIG. 8*d*. The bonding of sealed ink jet nozzle plate 870 to base 850 may be accomplished by a variety of well known bonding techniques, such as epoxy bonding or metal bonding, as discussed in previous embodiments.

After bonding the top surface of sealed ink jet nozzle plate 870 to base 850, modified bottom substrate layer 818*a* as well as seed layer 844 and portions of plate layer 846 may be removed entirely or in part by dry or wet etching or by a combination of grinding and dry or wet etching, as shown in FIGS. 8*e*–8*i*, to provide nozzle plates of precise geometries and material surfaces. FIGS. 8*e*–8*i* illustrate such methods of processing, in which the sealed ink jet nozzle plate 870 is modified to have nozzle openings, such as nozzle openings 834*a* of FIG. 8*e*, through which ink may pass.

Figure 8E:
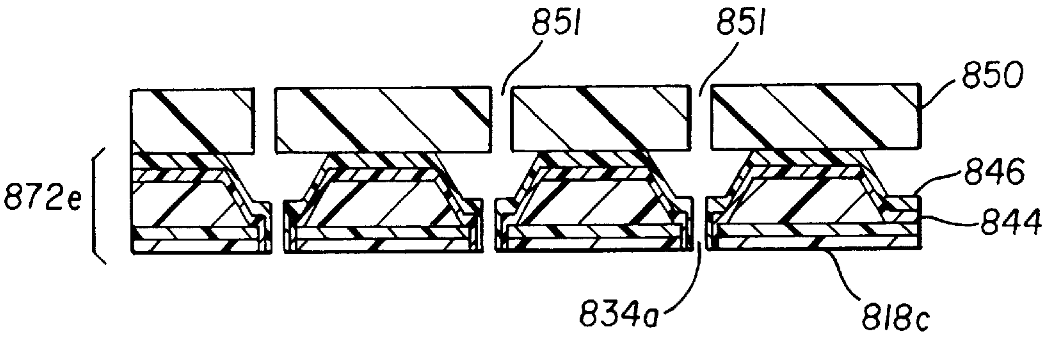

For example, in FIG. 8*e*, modified bottom substrate layer 818*a* is shown removed, for example by grinding followed by chemical mechanical polishing, except for a portion 818*c* of modified bottom substrate layer 818*a* which is not removed. The bottom portion of plate layer 846 and seed layer 844 comprising sealed ink jet nozzle plate 870 is also removed by the grinding and polishing process thereby providing nozzle plate 872*e* having nozzle openings 834*a* through which ink may pass as it flows from ink delivery channels 851.

Figure 8F:
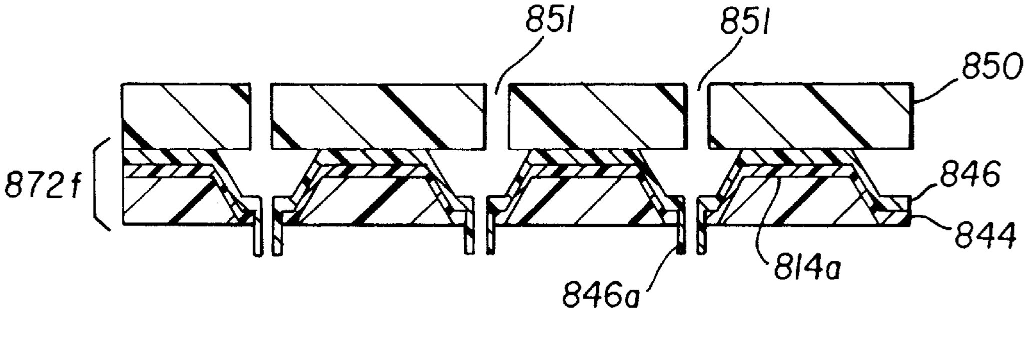

In a related process, shown In FIG. 8*f*, all of modified bottom substrate layer 818*a* and all of modified buried layer 816*a* are shown removed to provide a nozzle plate 872*f* having an extended portion 846*a* extending beyond modified top substrate layer 814*b*. Since the plate layer 846 and seed layer 844 are made by thin film deposition techniques, the walls of the extended portion 846*a* are thin, which is advantageous in preventing spreading of ink exiting from the nozzle.

Figure 8G:
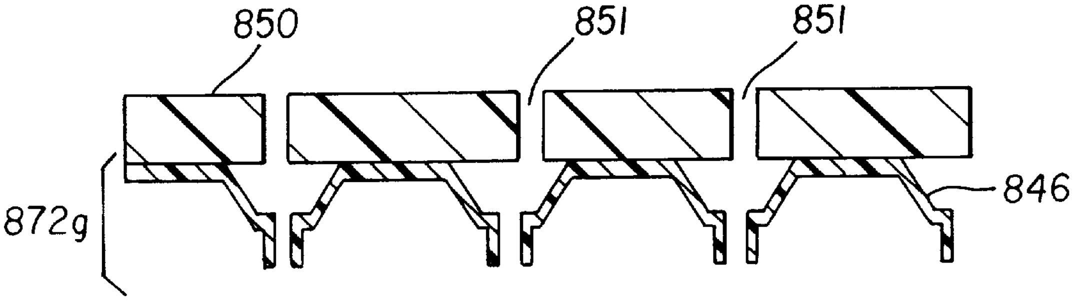

In another related process, shown In FIG. 8*g*, all of modified bottom substrate layer 818*a*, all of modified buried layer 816*a*, and seed layer 844 have been removed to provide nozzle plate 872*g*, made of a single material.

Figure 8H:
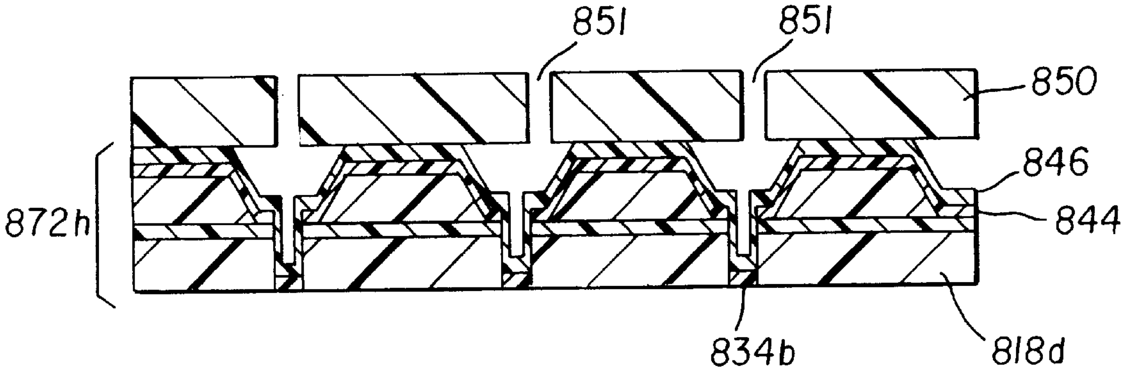
Figure 8I:
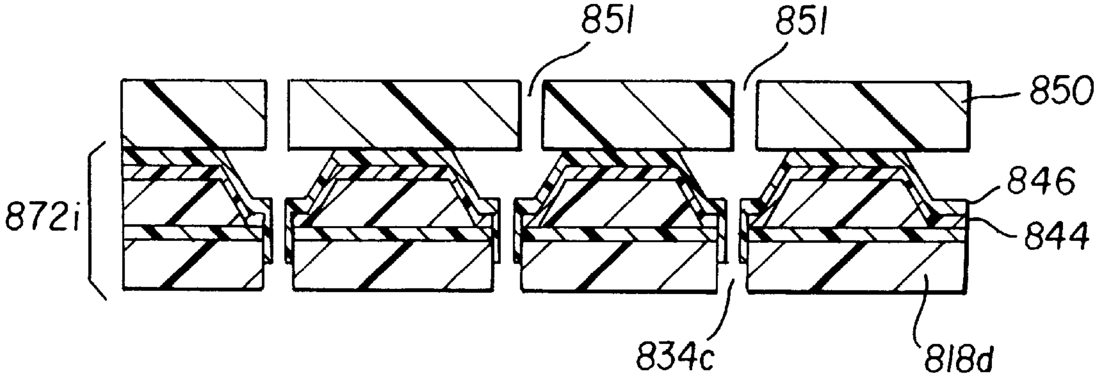

In another related process, shown In FIG. 8*h*, only a portion of modified bottom substrate layer 818*a* has been removed leaving a modified bottom substrate layer 818*d*. Nozzle plate 872*h* is shown still sealed by end portion 834*b* of sealed ink jet nozzle plate 870 (shown in FIG. 8*c*). Sealing ink jet cavities from the effects of particulate contamination is known to be a useful means of increasing yields and reducing costs of manufacture. In FIG. 8*i*, a dry etch has been used to remove the end portion 834*b* of nozzle plate 872*h* of FIG. 8*h* to form nozzle plate 872*i* having a recessed portion 834*c*. Such recessed surfaces are known in the art of ink jet nozzle manufacture to be advantageous in controlling the position of the ink meniscus.

The preferred embodiment in accordance with this invention a provides very small and accurately dimensioned nozzles which may be transferred to a final location while sealed from particulate contamination, as is well known to be advantageous during assemble processes.

The invention has been described in detail with particular reference to certain preferred embodiments thereof, but it will be understood that variations and modifications can be effected within the spirit and scope of the invention.

Parts List

10 composite substrate
12 cavity
14 top substrate layer
14*a* inclined wall
16 buried layer
18 bottom substrate layer
20 mask
20*a* opening
30 transfer substrate
34 nozzle cavity
34*a* vertical wall
50 base
51 ink deliver channel
80 ink jet nozzle plate
80*a* exit surface
84 bore region
84*a* opening
210 composite substrate
212 recess
212*a* inclined wall
212*b* inner surface
214 top substrate layer
214*a* modified top substrate layer
216 buried layer
216*a* ink jet nozzle plate outer surface
216*b* modified buried layer
218 bottom substrate layer
220 mask Parts List (continued)

222 nozzle mask
222*a* opening
250 base
251 ink deliver channel
252 transfer substrate
256 ink actuator base
280 ink jet nozzle plate
280*a* ink jet nozzle structure
284 bore region
286 cavity
318 nozzle plate overcoat
384 bore region
412 first etched region
412*a* inclined wall
412*b* inner surface
414*a* modified top substrate layer
416 buried layer
416*a* nozzle plate outer surface
418 bottom substrate layer
422 mask
422*a* openings
430 composite substrate
444 seed layer
445 nozzle plate layer
446 plate layer
446*a* top layer
448 outer plate
450 base Parts List (continued)

451 ink deliver channel
452 first transfer substrate
543 second transfer substrate
480 ink jet nozzle plate
480*a* flexible ink jet nozzle plate
484 bore region
486 cavity
510 composite substrate
512 first etched region
512*a* inclined walls
514 top substrate layer

514*a* modified top substrate layer
514*b* modified top substrate layer
516 buried layer
516*a* modified buried layer
518 bottom substrate layer
518*a* modified bottom substrate layer
518*b* modified bottom substrate layer
520 cavity mask
520*a* opening
522 bore mask
522*a* opening
523 composite mask
534 etched region
540 vertical wall
551 ink deliver channel
554 final device substrate
580 ink jet nozzle plate
Parts List (continued)
612 etched region
614 top substrate layer
614*a* modified top substrate layer
614*b* modified top substrate layer
614*c* exposed surface
616 buried layer
616*a* modified buried layer
618 bottom substrate layer
618*a* modified bottom substrate layer
620 cavity mask
629*a* opening
622 bore mask
622*a* opening
630 composite substrate
634 bore region
640 bore liner layer
646 ink jet nozzle plate layer
651 ink deliver channel
654 final device substrate
710 composite substrate
712 etched regions
712*a* inclined walls
714 top substrate layer
714*a* modified top substrate layer
714*b* modified top substrate layer
716 buried layer
716*a* modified buried layer
718 bottom substrate layer
Parts List (continued)
718*a* modified bottom substrate layer
718*b* modified bottom substrate layer
720 cavity mask
720*a* openings
722 bore mask
722*a* openings
723 composite mask
734 bore etch region
744 seed layer
744*a* upper portion
744*b* lower portion
744*e* horizontal region
745 nozzle plate
746 plate layer
751 ink deliver channel
754 final device substrate
780 ink jet nozzle plate
810 composite substrate
812 etched region
814*b* modified top substrate layer
816*a* modified buried layer
818*a* modified bottom substrate layer
818*b* modified bottom substrate layer
818*c* portion of modified bottom substrate layer 818*a*
818*d* modified bottom substrate layer
820 cavity mask
834*a* nozzle opening
834*b* end portion
Parts List (continued)
834*c* recessed portion
840 bore liner
844 seed layer
846 plate layer
846*a* extended portion
850 base
851 ink deliver channel
870 sealed ink jet nozzle plate
872*e* nozzle plate
872*f* nozzle plate
872*g* nozzle plate
872*h* nozzle plate
872*i* nozzle plate

What is claimed is:

1. A method for forming an inkjet nozzle plate, comprising the steps of:
   a) providing a structure having a top substrate layer, a bottom substrate layer, and a buried layer disposed between the top substrate layer and the bottom substrate layer;
   b) providing a composite mask over the top substrate layer having a cavity mask which provides openings and a bore mask having openings which are entirely within the openings of the cavity mask and extend to the top substrate layer;
   c) anisotropically etching through the bore mask openings through top substrate layer and the buried layer into a portion of the bottom substrate layer;
   d) removing the bore mask and etching the top and bottom substrate layers without substantially affecting the buried layer to extend the openings in the top substrate layer and the bottom substrate layer;
   e) removing the cavity mask and depositing a seed layer over the top substrate layer and into portions of the bottom substrate layer to define bore region openings in the seed layer and depositing an ink jet nozzle plate layer over the upper portion of the seed layer; and
   i) attaching the ink jet nozzle plate layer to a base provided with ink delivery channels which correspond to the openings in the ink jet nozzle plate layer.

2. The method of claim 1 wherein the top substrate layer and bottom substrate layer are silicon and the buried layer is silicon dioxide.

3. The method of claim 1 wherein the ink jet nozzle plate layer includes at least two sublayers, one of which is formed of a metal.

4. The method of claim 1 wherein the ink jet nozzle plate layer is a single metal layer.

5. The method of claim 1 in which step e) further includes depositing a release layer before deposition of the ink jet nozzle plate layer.

* * * * *